United States Patent
Ullman et al.

(10) Patent No.: US 10,926,868 B1
(45) Date of Patent: Feb. 23, 2021

(54) DISTRIBUTED LEADING-EDGE LIFTING SURFACE SLAT AND ASSOCIATED ELECTRIC DUCTED FANS FOR FIXED LIFTING SURFACE AIRCRAFT

(71) Applicant: CubCrafters Group LLC, Yakima, WA (US)

(72) Inventors: David G. Ullman, Independence, OR (US); Vincent H. Homer, Independence, OR (US); Patrick J. Horgan, Naches, WA (US)

(73) Assignee: CubCrafters Group LLC, Yakima, WA (US)

( * ) Notice: Subject to any disclaimer, the term of this patent is extended or adjusted under 35 U.S.C. 154(b) by 0 days.

(21) Appl. No.: 17/079,911

(22) Filed: Oct. 26, 2020

Related U.S. Application Data

(60) Provisional application No. 62/992,684, filed on Mar. 20, 2020.

(51) Int. Cl.
| | |
|---|---|
| *B64C 13/50* | (2006.01) |
| *B64C 9/24* | (2006.01) |
| *B64D 29/02* | (2006.01) |
| *B64D 27/24* | (2006.01) |
| *B64D 41/00* | (2006.01) |
| *B64D 31/06* | (2006.01) |
| *B64C 13/26* | (2006.01) |

(Continued)

(52) U.S. Cl.
CPC .............. *B64C 13/50* (2013.01); *B64C 9/18* (2013.01); *B64C 9/24* (2013.01); *B64C 11/001* (2013.01); *B64C 13/26* (2013.01); *B64D 27/24* (2013.01); *B64D 29/02* (2013.01); *B64D 31/06* (2013.01); *B64D 41/00* (2013.01); *B64D 2041/005* (2013.01)

(58) Field of Classification Search
CPC ........... B64C 13/50; B64C 13/26; B64C 9/24; B64C 11/001; B64C 9/18; B64D 27/24; B64D 29/02; B64D 31/06; B64D 41/00; B64D 2041/005
See application file for complete search history.

(56) References Cited

U.S. PATENT DOCUMENTS

| | | | | |
|---|---|---|---|---|
| 3,018,983 | A | * | 1/1962 | Davidson .............. B64C 23/005 244/15 |
| 10,099,793 | B2 | * | 10/2018 | Ullman .................. B64D 29/02 |

(Continued)

*Primary Examiner* — Valentina Xavier
(74) *Attorney, Agent, or Firm* — Carrie Stroup

(57) ABSTRACT

A powered aerodynamic lift device positioned on a leading edge of an aerodynamic lifting element (ALE), e.g. an airfoil, at least one slat/nacelle/EDF lift assembly comprising: a slat, a two or more nacelles positioned beneath the slat, each nacelle housing an electric ducted fan (EDF). The nacelles are spaced apart to create gaps between the slat and the airfoil for accelerated air to pass through. The lift assembly is under the operational control of and/or further comprises: a master control unit linked to a power source, e.g. batteries to power the EDFs. The device provides the ALE and aircraft with: increased lift and additional thrust during aircraft take offs, climbs, descents, and landings; enhanced low-speed control and reduced loss-of-control during an aircraft's takeoff and landing; improved aircraft handling during gusts and crosswinds. The present invention also comprises an ALE or aircraft with at least one lift assembly installed thereon.

19 Claims, 16 Drawing Sheets

(51) Int. Cl.
*B64C 11/00* (2006.01)
*B64C 9/18* (2006.01)

(56) References Cited

U.S. PATENT DOCUMENTS

2016/0245227 A1* 8/2016 Crawford .................. F02K 1/72
2017/0190436 A1* 7/2017 Ullman .................... B64C 3/32

* cited by examiner

DISTRIBUTED LEADING-EDGE LIFTING SURFACE SLAT AND ASSOCIATED ELECTRIC DUCTED FANS FOR FIXED LIFTING SURFACE AIRCRAFT

CROSS REFERENCE TO RELATED APPLICATIONS

This utility patent application claims the benefit of U.S. Provisional Patent Application No. 62/992,684, filed on Mar. 20, 2020, which is hereby incorporated in by reference in its entirety.

BACKGROUND OF THE INVENTION

There is a strong need to develop aircraft that can take off and land in short distances. Shortening these distances requires higher lift at low speeds and improved low speed control capabilities.

The prior art discloses U.S. Pat. No. 10,099,793 B2, by David G. Ullman and Vincent Homer, entitled "DISTRIBUTED ELECTRIC DUCTED FAN LIFTING SURFACE", which issued on Oct. 16, 1018. This patent discloses the use of a plurality of EDF's positioned on the aircraft wing leading edge. This system provides, for example, the benefits of: enhanced lift during all phases of flight, reductions of stalls, and enhanced Short Take Offs and Landing (STOL).

The present invention is a non-obvious improvement of this prior art, and comprises a slat/nacelle/EDF assembly on the airfoil leading edge that significantly increases the airfoil's lift and thrust to improve the aircraft's take off, climb, descent, and landing capabilities. The slat/nacelle/EDF assembly is uniquely comprised of a leading edge slat supported by two or more EDFs housed in nacelles that additionally support the slat and guide the airflow. Where the prior art addressed the airflow directly accelerated by the EDFs during all phases of flight, this improvement also accelerates and entrains the air between nacelles at high angles of attack, during takeoff, climb out, descent and landing, to enhance the benefits of the prior art. Where the prior art was intended as the prime propulsion system for the aircraft during all phases of flight, this slat/nacelle/EDF assembly embodiment is specifically designed to supplement the prime propulsion during the terminal phases of aircraft missions with high lift and improved controllability. Further, in some embodiments the assembly can be installed and removed as a single unit rendering it an add-on to an existing aircraft. In other embodiments it can be retracted when not in use during cruise portions of the flight.

SUMMARY OF THE INVENTION

The present invention comprises a powered aerodynamic lift assembly, comprising: one or more lift (i.e. slat/nacelle/EDF) assemblies distributed along a span of an upper aerodynamic surface near the leading edge. Each lift assembly comprises: i) a slat positioned near the leading edge of the aerodynamic lifting element; ii) two or more nacelles positioned beneath and connected to a slat, wherein said nacelles are spaced apart to create at least one gap between the slat and the leading edge of the aerodynamic lifting element; and ii) an electric duct fan (EDF) housed within each of the one or more nacelles, each EDF comprising a fan and a power source to operate the fan, wherein each EDF forces accelerated air through the fan and the gaps. The one or more lift assemblies provide the aerodynamic lifting element increased lift and thrust, augmented airflow to enhance stall characteristics of the main lifting body, enhanced low-speed control and reduced loss-of-control during an aircraft's takeoff, climb out, descent and landing, and improved aircraft handling during gusts and crosswinds. An exemplary embodiment is a product comprising the lift assembly that is used to supplement an already existing aircraft wing—e.g. at least one lift assembly per aircraft wing.

In an additional embodiment, the powered aerodynamic device comprises a new aircraft with at least one lift assembly pre-installed, comprising a) at least one aerodynamic lifting element (ALE) on an aircraft, the ALE comprising a span, a leading edge, trailing edge, and an upper aerodynamic surface; b) one or more slat/nacelle/EDF assemblies distributed along the span of said upper aerodynamic surface near the leading edge, each slat/nacelle/EDF assembly comprising: i) a slat positioned above the leading edge of the aerodynamic lifting element; ii) two or more nacelles positioned beneath and connected to the slat, wherein said nacelles are spaced apart to create at least one gap between the slat and the leading edge of the aerodynamic lifting element; ii) an electric duct fan (EDF) housed within each of the one or more nacelles, each EDF comprising a fan and a power source to operate the fan, wherein each EDF forces accelerated air through the fan and the gaps; and c) wherein the one or more slat/nacelle/EDF assemblies provide the aerodynamic lifting element increased lift and thrust, enhanced low-speed control and reduced loss-of-control during an aircraft's takeoff and landing, and improved aircraft handling during gusts and crosswinds.

In all embodiments of the present invention, each slat is supported by at least two nacelles, spaced apart to create air gaps, each nacelle housing one electric ducted fan (EDF).

This lift assembly described here is not intended to be the primary propulsion system of an aircraft but to enhance aircraft performance during the terminal phases of flight. As such it is optional to flight and in some embodiments can be made removable or retractable.

In an embodiment the lift assembly described here can provide sufficient propulsion to fully power the aircraft in all phases of flight.

In an embodiment, the slat has a length that is substantially equal to the span of the aerodynamic lifting element.

In another embodiment, the slat has a length that is less than the span of the aerodynamic lifting element.

In another embodiment there are multiple discontinuous slat/nacelle/EDF assemblies on each span of the aerodynamic lifting element.

In another embodiment, the slat of the slat/nacelle/EDF assembly comprises a variable cross section, relative position to the aerodynamic lifting element, cross section, or a twist.

In another embodiment, the one or more nacelles and/or the slat/nacelle/EDF assembly are retractable into the aerodynamic lifting element.

In another embodiment, the slat/nacelle/EDF assembly is detachable and securely attachable from the aerodynamic lifting element.

In another embodiment, the present invention comprises cascaded slat/nacelle/EDF assemblies.

In another embodiment, the aerodynamic lift device further comprises a trailing edge flap.

In another embodiment, the present invention further comprises: one or more lift modifiers positioned aftward of the slat/nacelle/EDF assembly, or on the slat, or on one or more nacelles.

In another embodiment, the present invention further comprises: an electrical circuit control system comprising a master control unit able to control the operation of one or more slat/nacelle/EDF assemblies, the master control unit comprising: 1) a plurality of electronic speed controllers (ESCs) able to control the speed of the EDFs, and 2) a plurality of actuators.

In another embodiment, the present invention further comprises: the master control unit further controls the modulation of energy supplied by the power source to the EDFs, wherein the power source comprises one or more of: batteries, a fuel cell, an engine/generator or other electrical energy source.

In another embodiment, the present invention further comprises: the EDF power source controlled by the pilot, automatically or some combination thereof.

In another embodiment, the control of the EDF power source is an analog or digital, open or closed loop circuit, comprising sensors able to detect: an angle-of-attack, an airspeed, and a local airflow pressures and velocities.

In another embodiment, the actuators are coupled to at least one flow modifier on the aerodynamic lifting element (ALE).

In another embodiment, the master controller further controls the geometric position or angle of the one or more slats such that the lift and thrust profiles along the span of the ALE are altered.

In another embodiment, the master controller further comprises ADAHRS that measure the state of the EDF comprising one or more of: rotational speed, power utilized or air flow rate, and sends the information back to master controller unit.

In another embodiment, the present invention further comprises: a bottom surface of the slat formed, or an upper surface of the ALE formed, to guide an EDF exhaust over the ALE to create a nozzle of enhanced accelerated airflow.

The present innovation provides improved, enhanced low-speed lift on takeoff, climb out, descent and landing, reducing loss-of-control (LoC) during these critical periods and provides improved control and improved handling qualities during gusts and crosswinds.

In an embodiment, the present invention further comprises a master controller unit linked with the distributed EDFs that allows for the novel and improved aerodynamics, reaction to pilot or autonomous commands, virtual elimination of stalls and reduction of the effect of turbulence. The instant innovation enhances short take-off and landing (STOL) performance.

BRIEF DESCRIPTION OF THE DRAWINGS

FIG. 3A is a top perspective view of a slat used in the slat/nacelle/EDF assembly.

FIG. 3B is a top perspective view of a slat with a twisted geometry.

FIG. 3C is a top perspective view of a slat comprising a varying chord and cross-sectional area.

FIG. 3D is an illustration of a slat positioned on the leading edge of an airfoil (i.e. an aerodynamic lifting element), and the slat varies in distance or angle relative to the leading edge.

DETAILED DESCRIPTION OF EXEMPLARY EMBODIMENTS

Glossary of Terms

Figure 1:
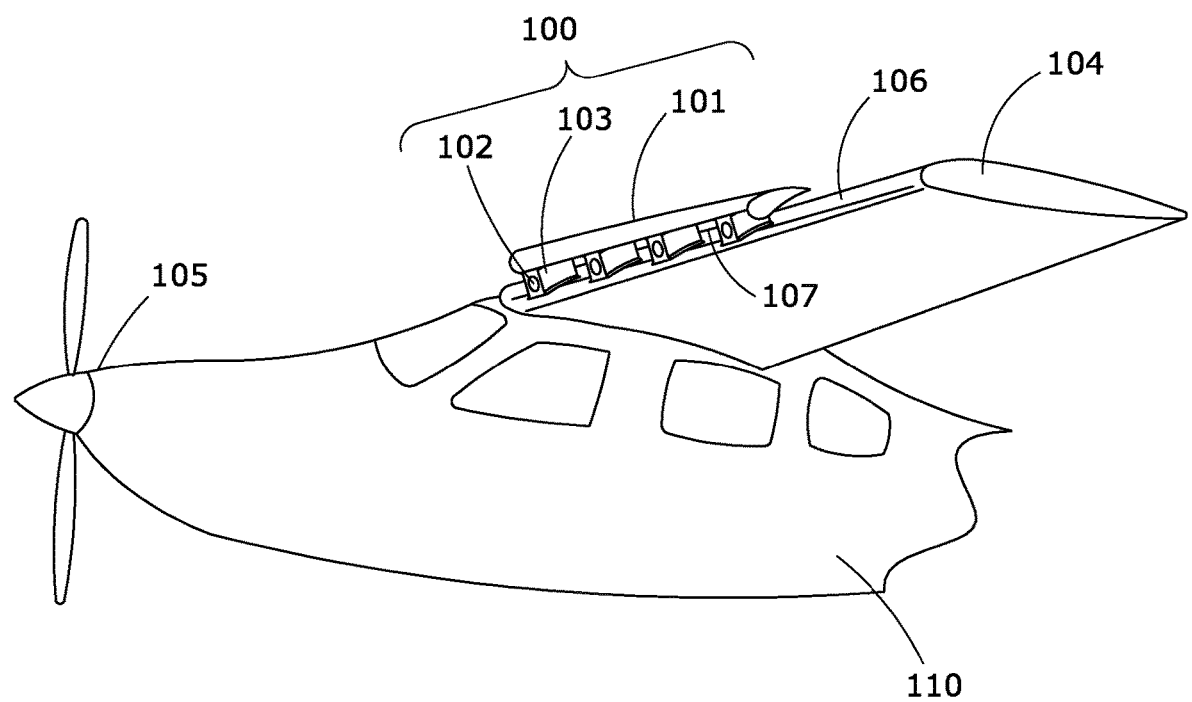
FIG. 1 illustrates an airplane comprising an aerodynamic lift device (wing) with one slat/nacelle/EDF assembly of the present invention positioned on the leading edge.

Described herein is an aircraft system comprising one or more leading edge airfoil slats distributed over the leading edge of an aerodynamic lifting element (ALE) (e.g. wing)

combined with EDFs mounted in nacelles so as to affect the flow of air in the gaps between the slat and the lifting surface. The slat/nacelle/EDF assembly directs air over the top surface of the lifting surface to increase lift and delay separation and stall. Slat geometry and position relative to the lifting surface may be variable along the span of the lifting surface and may be changed in flight. Multiple slat/nacelle/EDF assemblies may be distributed along the leading edge of the lifting surface. These may be individually or collectively controlled to provide a lift profile over portions of the lifting surface that is manually or automatically tailored to enhance lift during all flight conditions.

As used herein, the term "powered aerodynamic lift device" refers to an aircraft aerodynamic element (ALE) (e.g. an airfoil or wing, FIG. 1, 104) having at least one slat/nacelle/EDF assembly 100 positioned on a leading edge of the airfoil, and powered by a unit onboard the aircraft in a manner disclosed herein.

As used herein, the term "slat/nacelle/EDF assembly" and "lift assembly" are used interchangeably (FIG. 1, 100), and comprise: a slat; two or more nacelles supporting the slat; an electric ducted fan (EDF) housed within each nacelle; and gaps formed between the slat and the leading edge (around the nacelles). The EDF's force accelerated air through the fans and the gaps to increase the aircraft's lift and thrust, amongst other enhanced performance capabilities. A slat/nacelle/EDF assembly may extend the entire span of the lifting surface, or a part thereof, and more than one slat/nacelle/EDF assembly may be positioned on each lifting surface.

As used herein, the term "slat" refers to a leading edge slat (moveable or fixed) with a gap between it and the aerodynamic lifting element (e.g. a wing). A fixed slat is often referred to as a slot. The slat is an airfoil positioned near the leading edge of a lifting surface to alter the flow during high angle of attack light phases; takeoff, climb out, descent and landing. Traditionally, slats cover the full span or partial span affecting only a portion of the lifting surface. Slats accelerate the air in the gap between them and the lifting surface to delay separation and stall of the lifting surface especially critical during takeoff, climb out, descent and landing phases of an aircraft's mission. According to an embodiment of the present invention, there may be a plurality of slats on a lifting surface (e.g. FIG. 5) each not connected directly to the others. Further, each slat may vary in chord, twist, section and spacing from the lifting surface. Each slat may change its position relative to the lifting surface due to aerodynamic forces or controlled to modify the flow over the lifting surface.

An Electric Ducted Fan (EDF) is an aircraft power plant comprising an electrically-driven propeller (e.g., a fan) mounted within a nacelle. According to embodiments, a plurality of EDFs are mounted to provide distributed accelerated flow in the gap between the lifting surface and the slat. Individual ones of the plurality of EDFs and the slat's position may be separately controlled to distribute the airflow as a position and time variable stream of high velocity air along the span of the lifting surface's upper surface. The high velocity flow over selected portions of the lifting surface may dramatically increase the overall lift of the airfoil, allowing the airplane to fly slower.

Each EDF is mounted in a nacelle that houses the EDF, supports the slat relative to the lifting surface and guides the air through and around the EDF. Each slat is supported by at least two or more nacelles. This combination of multiple EDFs and nacelles supporting a slat and forming a gap will be referred to as the "slat/nacelle/EDF assembly" in the remainder of this description.

The slat and nacelle provide a nozzle of accelerated airflow (e.g. FIG. 2, 201) for each EDF, regulating air flow through the gap and over the upper surface of the lifting body. This flow may be further shaped by vortex generators, vanes, fences, spades, flaps, surface textures or other flow modifiers mounted on the lifting surface, slat, or nacelle. The geometry of these flow modifiers may be adjusted in accordance with the attack angle of the lifting surface or other aircraft flight parameter to provide optimal airflow from each EDF. The flow modifiers may be fixed or alternatively actively controlled or retracted. In an embodiment, system 100 of the present invention comprises: an aerodynamic element (e.g. airfoil 104) with: 1) one or more slat/nacelle/EDF assemblies positioned on the leading edge 107; and 2) one or more flow modifiers positioned aftward of the slat/nacelle/EDF assemblies (see FIG. 6).

Aircraft comprising the combination of slats, distributed EDFs, nacelles and optional flow modifiers may demonstrate very short takeoff, increased rate of climb, steeper decent, and reduced landing distance without excessive angle of attack and with an improved margin of safety to stall. The system of the present invention is a non-obvious improvement of over the system disclosed in U.S. Pat. No. 10,099,793 B2, David G. Ullman and Vincent Homer, entitled "DISTRIBUTED ELECTRIC DUCTED FAN LIFTING SURFACE", which issued on Oct. 16, 1018, which only discloses the use of a plurality of EDF's positioned on the wing leading edge.

Distributed slat/nacelle/EDF modifier combinations may provide greater control of pitch, bank and yaw without reliance on control surfaces. In addition, the effects of turbulence may be mitigated, due to correction of sudden accelerations due to turbulent air. Shed vortices may be reduced as well. System failures may also be mitigated, such as elimination stalling, as well as compensation for wind gusts or cross winds during takeoff and landing.

Slat/nacelle/EDF assemblies may be permanently affixed to the lifting or may be removable as a whole or in sections from the lifting surface for optional stowage in the fuselage of the aircraft or external to the aircraft. Further the slats may be adjustable in position or geometry to redirect the EDF exhaust and the flow through the gap. The nacelle with attached EDF and slat may also be retractable into the lifting surface when not in use.

In FIG. 1, aircraft 110 illustrates a representative embodiment of the present invention, and comprises: a high wing lifting element (e.g. wing) 104 and has a slat 101 positioned near the leading edge 106 of the lifting surface to improve lift during takeoff and landing. The lifting surface may be a wing 104 as in this embodiment or other horizontal surface, and may be mounted high, shoulder or low vertical positions with respect to the fuselage. In the gap 107 between the slat 101 and the lifting surface 202, there are mounted a plurality of electric ducted fans (EDFs) 102, one EDF each mounted in a nacelle 103. Nacelle 103 not only houses the EDF, but it also attaches and relatively positions the slat 101 to the lifting surface 104.

Also shown in FIG. 1 is the aircraft's primary propulsion system 105. This can be an internal combustion, electric or other aircraft engine. While this engine provides the prime thrust, the instant innovation primarily provides lift and controllability with some additional or secondary propulsion. The distributed slat, EDF and nacelle system could also serve as a supplement to the primary aircraft propulsion system or a redundant propulsion system with limited thrust in case of primary propulsion system loss. In some examples the slat/nacelle/EDF assembly 100 may be the prime mover negating the need for 105.

Figure 2:
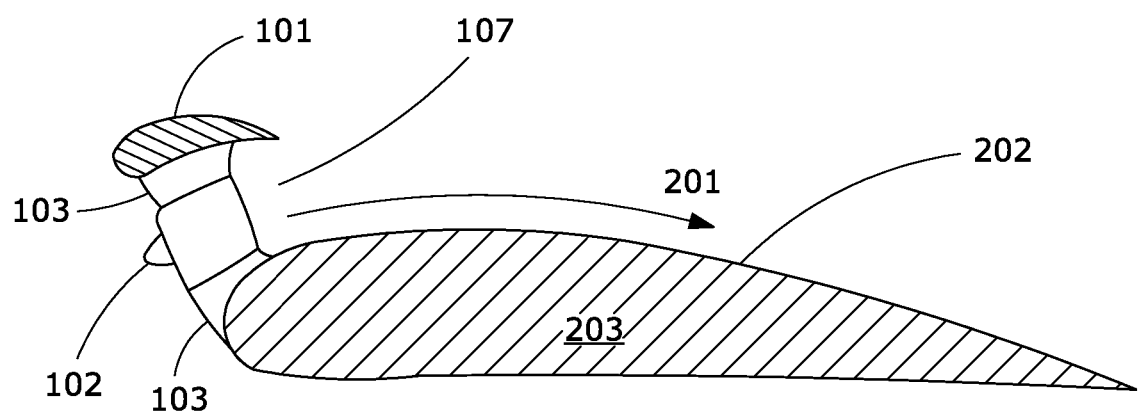
FIG. 2 is a longitudinal cross-sectional view of a typical installation of the slat/nacelle/EDF assembly on the leading edge of an airfoil (i.e. of an aerodynamic lift device).
Figure 3A:
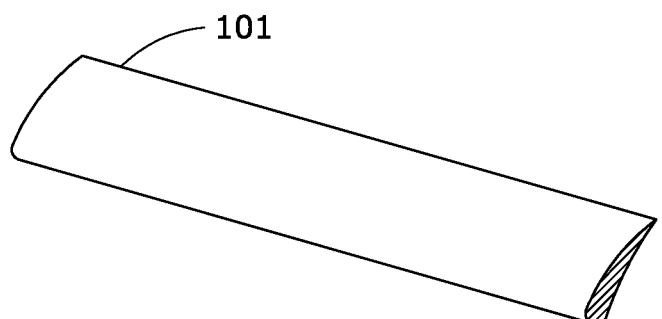
FIGS. 3A-3D are illustrations of exemplary slats for use in the present invention.
Figure 3B:
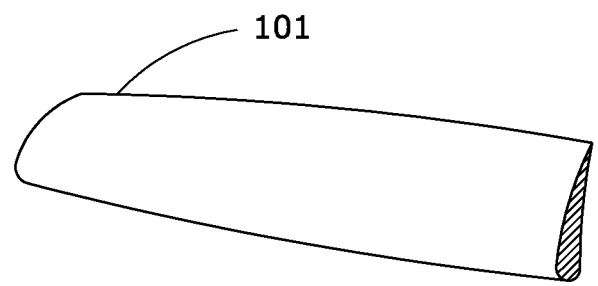
Figure 3C:
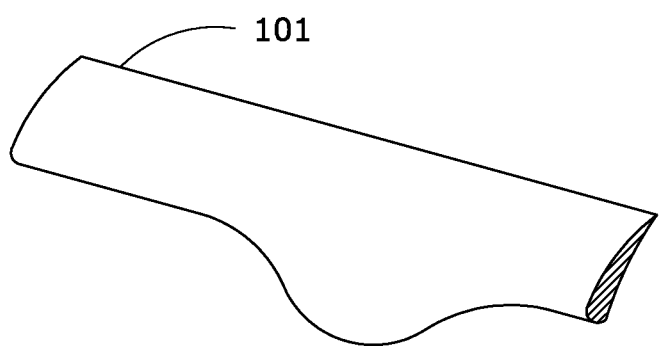
Figure 3D:
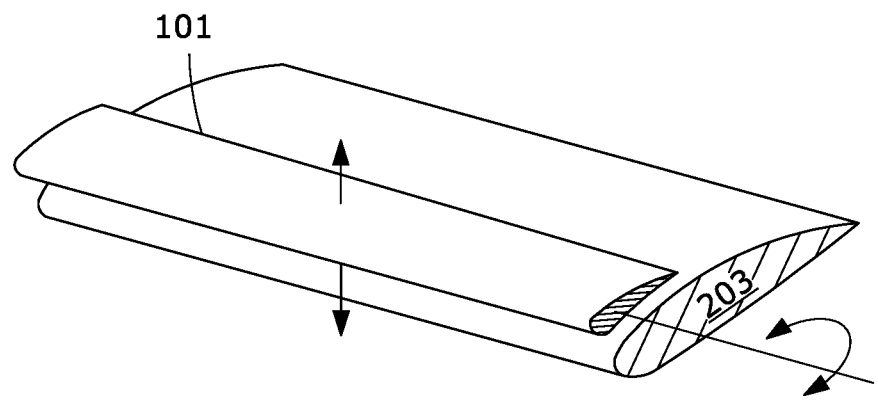

FIG. 2 is an illustration of a longitudinal cross-sectional or side view of a representative embodiment of an installation. In all embodiments, each installation of an Electric Ducted Fan (EDF) 102 is housed in a nacelle 103 positioned to support slat 101 so that the assembly directs the air blown by the EDF aftward 201 over upper aerodynamic surface 202 of airfoil section 203 of an aerodynamic lifting element 104 (e.g. the entire wing of FIG. 1)). Each ducted fan installation EDF 102 accelerates the air directly aft of it 201 and the combination of the EDF 102 and the slat 101 accelerate the air in the gap 107 on either side of the nacelle 103. Gap 107 geometry can optionally be controlled, powered by the aerodynamic force or motorized with active controls. It will be understood that slat 101 and the associated EDFs 102 and nacelles 103 are one of a plurality of leading-edge lifting surface slat/nacelle/EDF lift assemblies 100 deployed along the lifting edge or surface span (FIG. 1, 106). Airfoil section 203 may be a fixed lifting surface or other aircraft lifting structure. While in the illustrated embodiment leading-edge lifting surface slat 101 has an airfoil cross section 203, other suitable shapes are also possible. In other embodiments, leading-edge lifting surface slat 101 may pivot, rotate, or be extendable by aerodynamic forces or a motorized mechanism any suitable distance from lifting surface 202.

In some embodiments, leading-edge lifting surface slat 101 has a progressively varying cross section. The progressively varying cross section may minimize stall tendencies of the immediately adjacent section of airfoil section 203 (e.g., an aircraft's upper lifting surface 202). Four representative samples of slat 101 geometry are shown in FIGS. 3A-3D used in this invention can be prismatic (FIG. 3A), be twisted (FIG. 3B), have varying chord and cross section (FIG. 3C), varying distance or angle relationship with the lifting surface (FIG. 3D), or any combination of the four. Further, the undersurface of the slat may be sculpted to interface with nacelles 103 or to sculpt the air flow from the EDFs 201 or in the gaps 107. In some embodiments, leading-edge lifting surface slat 101 comprises a suitable composite material, such as, but not limited to, fiberglass, carbon fiber or Kevlar.

Figure 4:
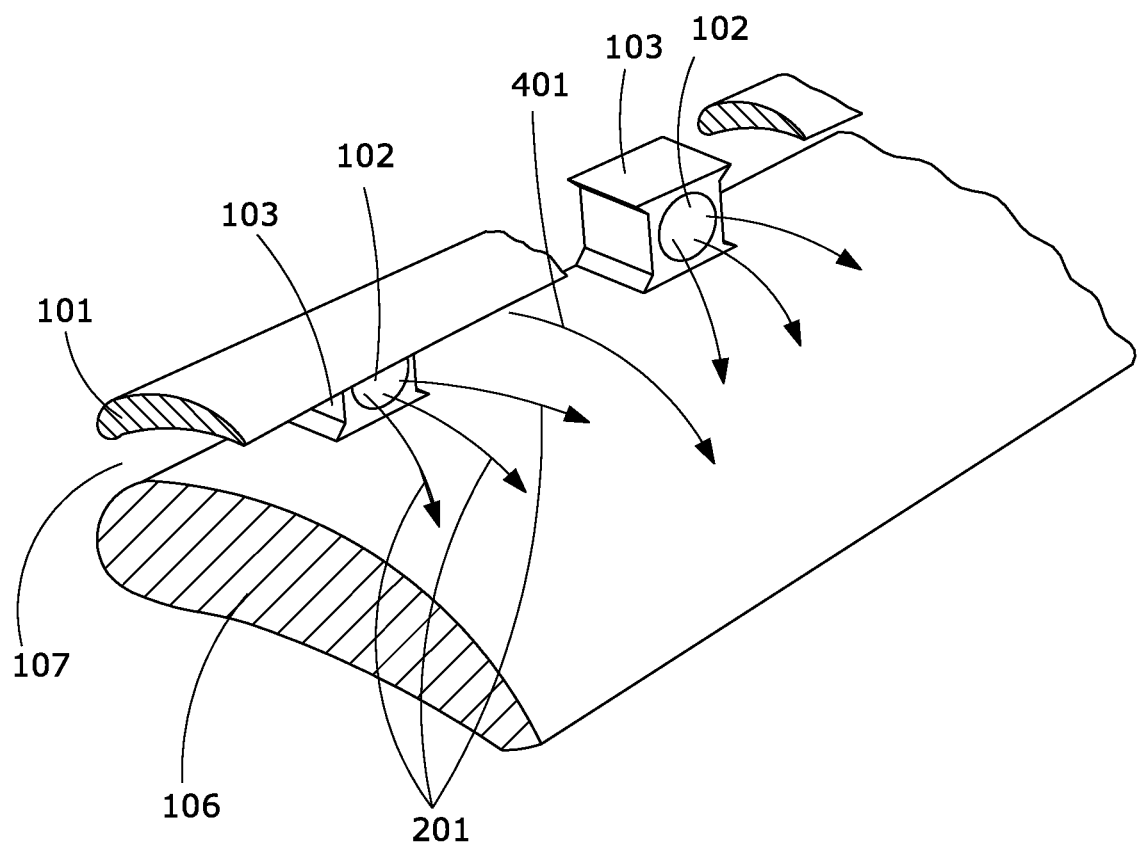
FIG. 4 is an illustration of the slat/nacelle/EDF assembly with part of the slat removed over one of the nacelles to demonstrate the accelerated airflow path emanating from the EDFs and the gap between the slat and the airfoil's lifting surface as influenced by the EDFs within the nacelles.

As shown in FIG. 4, the air flowing in the gap 107 between the leading edge 106 and the slat 101 is either freely flowing air 401 or is accelerated air 201 by the EDFs 102. The design of the nacelles 103 combined with the geometric shape of the gap 107 and the nacelles 103 determines the shape of the flow 201 from the EDFs 102 and how it entrains the flow through the other, freely flowing sections of the gap 401. The nacelles 103 that house the EDFs 102 are shaped: to minimally impede the free flow of air 401 when the EDFs are unpowered; direct the EDF exhaust 201, and entrain the free flow of air 401 when they are on; and physically support the slat 101 relative to the lifting edge surface 106.

Figure 5:
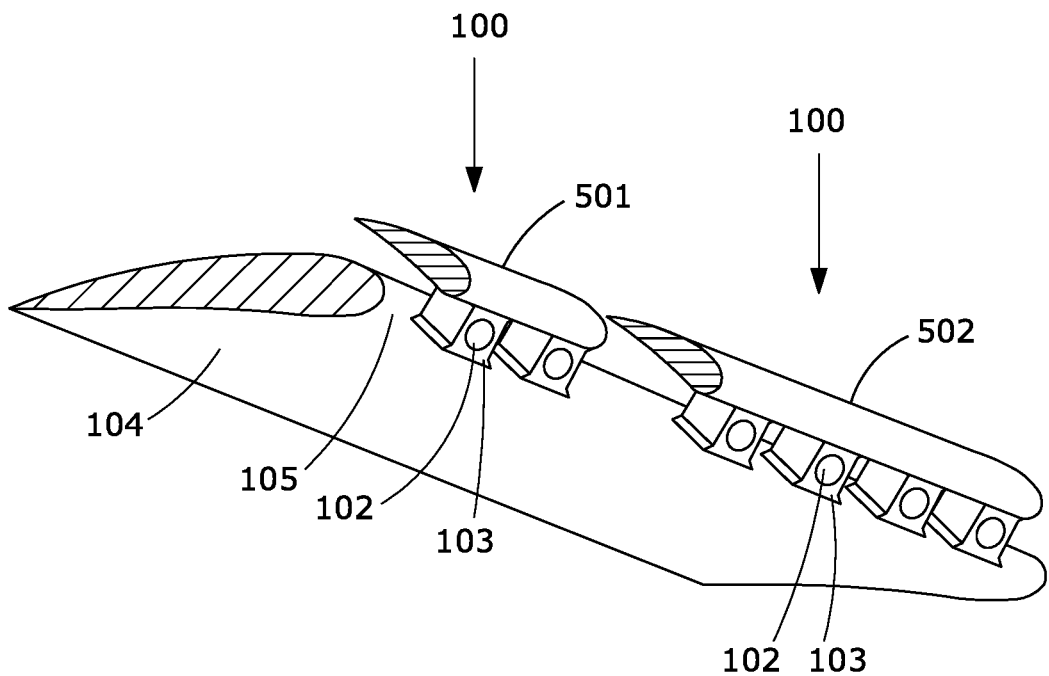
FIG. 5 is an illustration of an airfoil comprising two aligned slats on the leading edge, one slat supported by two nacelles, and another slat supported by four nacelles, wherein each nacelle houses one EDF.

Referring to FIG. 5: in some embodiments, leading edge lifting surface slat/nacelle/EDF assembly 100 extends laterally over a section of leading edge 106 of wing section 104 at a length that is less than the total span of the lifting surface 104. As an example, a suitable section length of slat/nacelle/EDF assembly 100 may be less than ⅓ of the total span of airfoil 104. A plurality of leading-edge lifting surface slat/nacelle/EDF assemblies 100 may fully or partially cover the leading edge of airfoil 104. The embodiment in FIG. 5 shows a short assembly 501 supported by two EDF's 102 carrying nacelles 103 and a longer assembly 502 is supported by four EDF's 102 carrying nacelles 103. All embodiments covered in the present disclosure have two or more nacelles supporting the slat. Standalone EDF embodiments are covered in U.S. Pat. No. 10,099,793 B2 without nacelles and slats as disclosed infra.

Figure 6A:
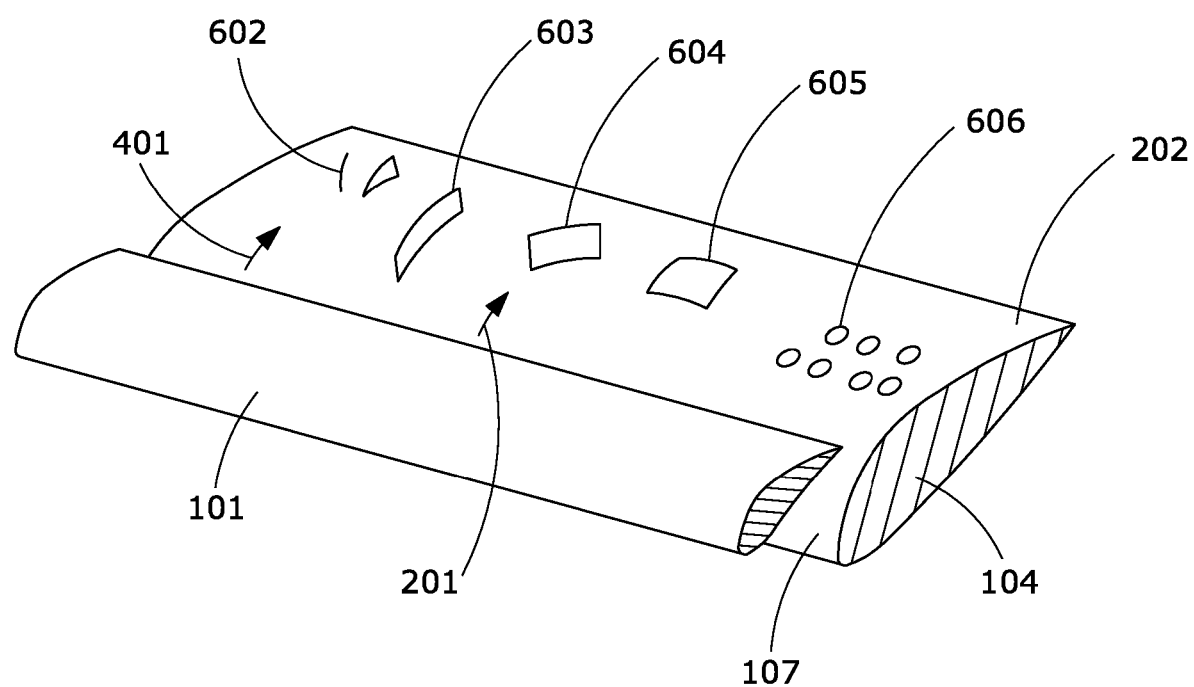
FIG. 6A is an illustration of an airfoil with one slat/nacelle/EDF assembly comprising a variety of types of flow modifiers that distribute the accelerated airflow emanating from the EDFs and the gap between the slat and the airfoil's lifting surface.
Figure 6B:
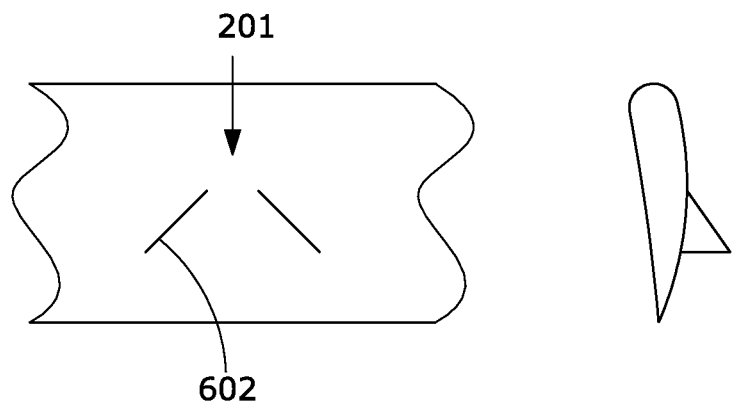
FIG. 6B is an illustration of a vortex generator.
Figure 6C:
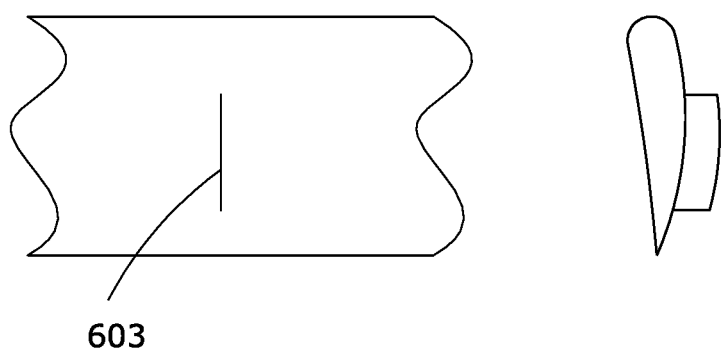
FIG. 6C is an illustration of a chordwise fence.
Figure 6D:
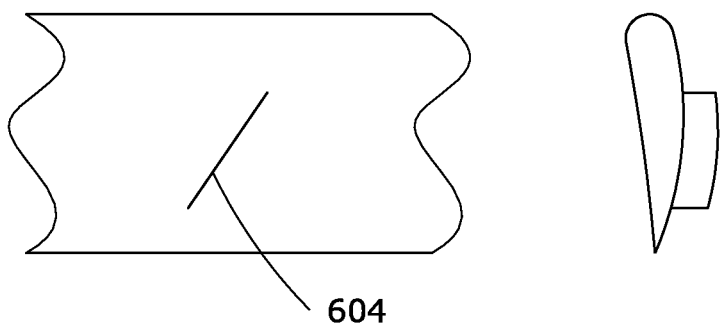
FIG. 6D is an illustration of a vane.
Figure 6E:
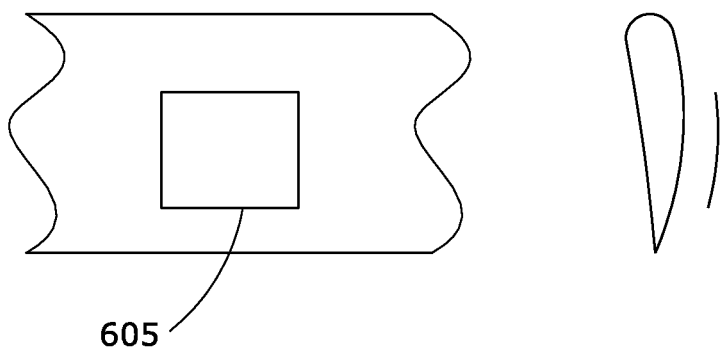
FIG. 6E is an illustration of a slat-like foil.

Referring to FIG. 6A: another embodiment the present invention comprises: an aerodynamic element (e.g. ALE 104) with: 1) one or more slat/nacelle/EDF assemblies positioned on the leading edge; 2) one or more flow modifiers positioned aftward of the slat/nacelle/EDF assemblies (see FIGS. 6, 602-606), and 3) flow emanating from the gap 107 between the slat 101 and the lifting surface 401 and flow directly accelerated by the EDFs 201. In some embodiments these flows can be directed to give a more desirable velocity stream over the upper lifting surface 202, thus increasing the lift, using flow modifiers, such as: vortex generators FIG. 6B, 602; chordwise fences FIG. 6C, 603; vanes oriented angled to the flow FIG. 6D, 604; and other slat-like foils mounted spanwise FIG. 6E, 605 on the lifting surface as shown, or alternatively on the slat or nacelle. In some embodiments the surface 202 can be textured or dimpled 606 to redistribute the flow. These airflow modification devices may be fixed or deployable and are well known to one of skill in the art.

Figure 7:
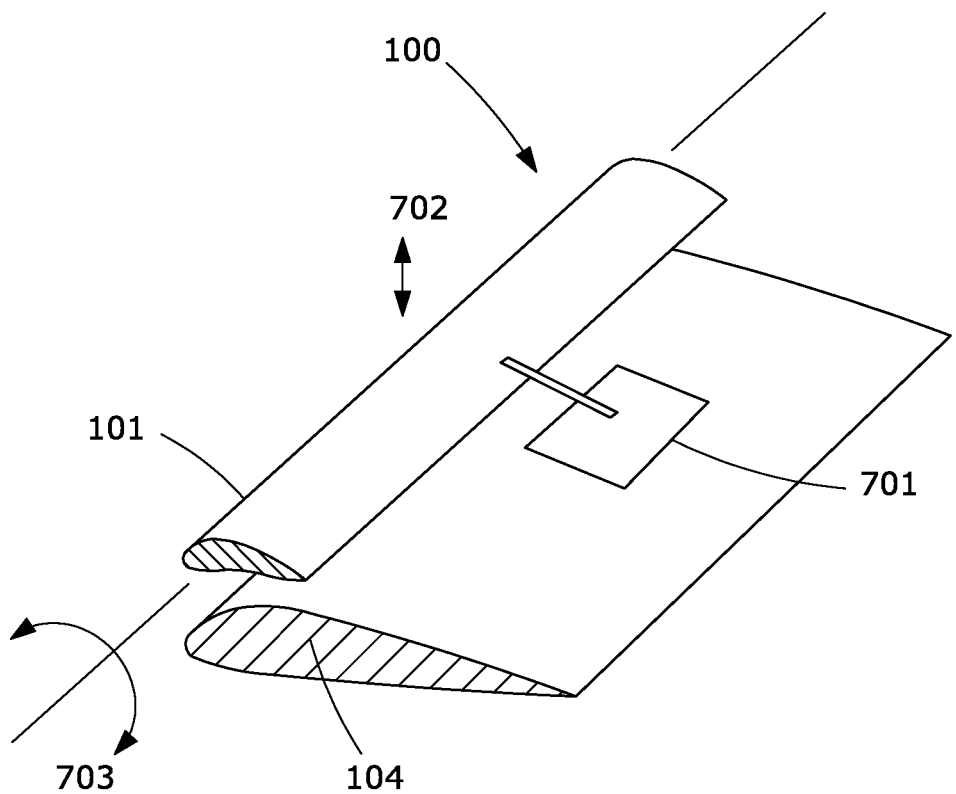
FIG. 7 is an illustration of the slat changing position and/or angle relative to the lifting surface in an electrically powered or aerodynamic powered manner.

Referring to FIG. 7: in some embodiments, the slat 101 can be designed to change its position 702 and angle 703 relative to the lifting surface 202 of ALE 104. These changes can be powered as will be described in the discussion for FIG. 12 or driven by aerodynamic forces as in this embodiment with a spade 701 in the free flow or EDF exhaust.

Figure 8A:
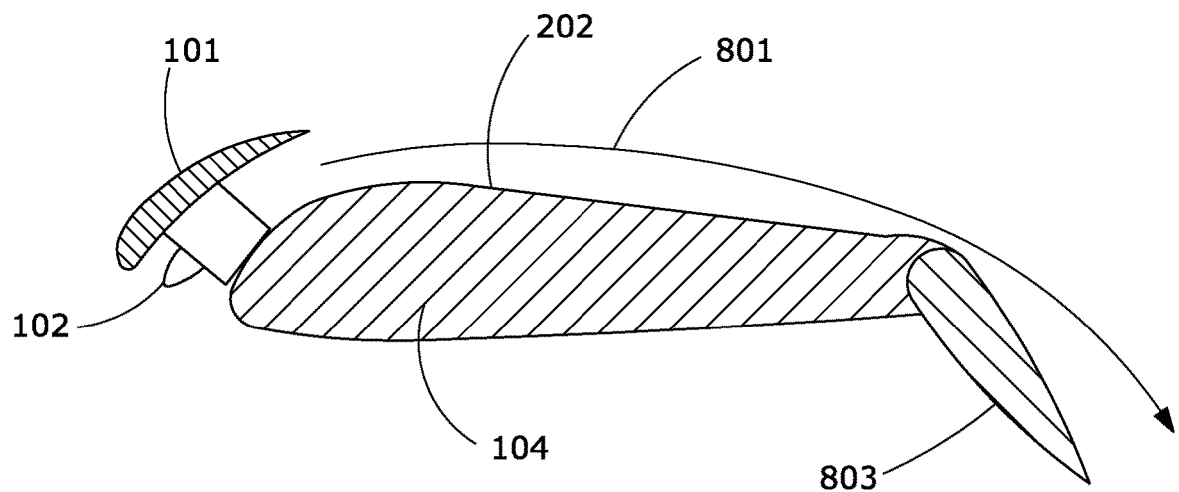
FIG. 8A is a longitudinal cross-sectional view of an airfoil comprising a slat/nacelle/EDF assembly on the leading edge, and a flap attached to the trailing edge where the airflow moves over the flap.
Figure 8B:
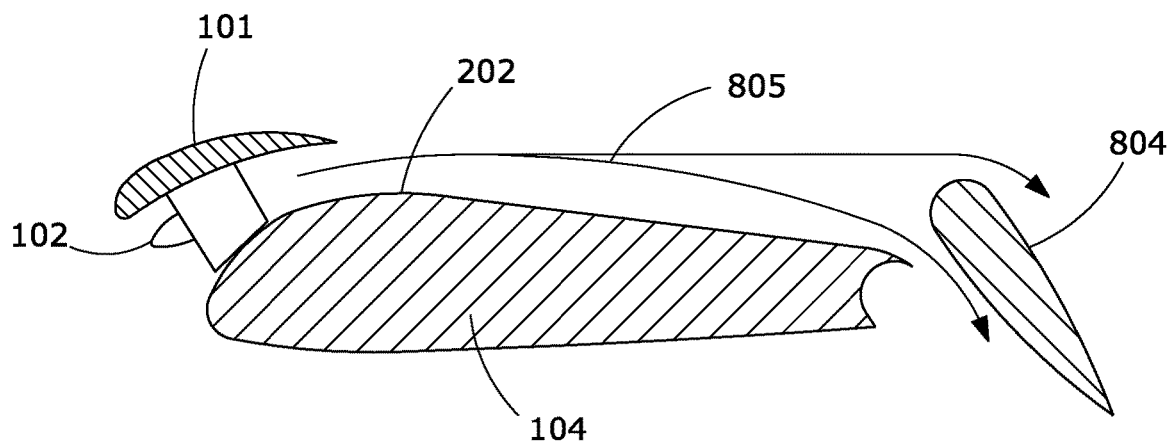
FIG. 8B is another longitudinal cross-sectional view of an airfoil comprising a slat/nacelle/EDF assembly on the leading edge, and a flap positioned above the trailing edge where the airflow moves both underneath and over the flap.

Referring to FIG. 8A: the flow over the rear portion 801 of the lifting surface 202 can be deflected by a trailing edge flap 803 to increase the lift or the drag on the surface in some embodiments. In FIG. 8A, flap 803 is attached to the airfoil or ALE 104 and the airflow 801 passes over the flap. In some embodiments as shown in FIG. 8B, the flap 804 leading edge is positioned above the airfoil or ALE 104 at the trailing edge, and the airflow 805 passes between the airfoil 104 and the bottom side of the flap 804 and over the top surface of the flap to accomplish the additional lift and drag.

Figure 9:
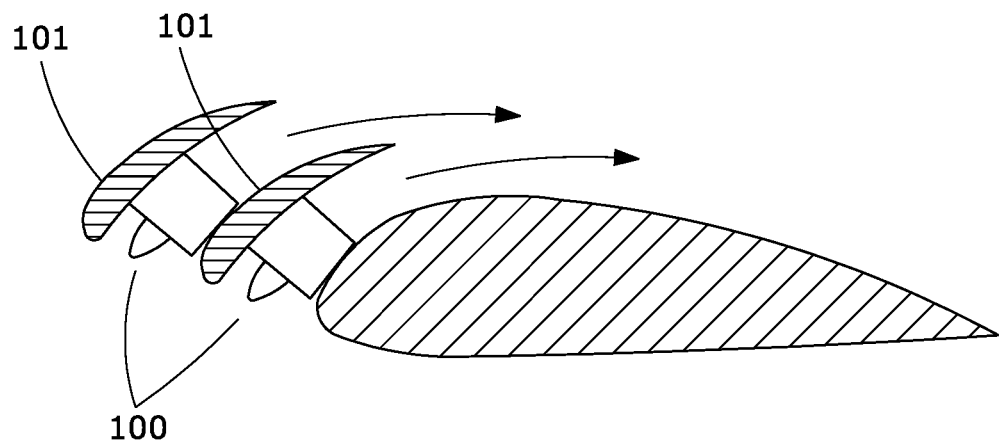
FIG. 9. illustrates a cascade of two vertically stacked slat/nacelle/EDF assemblies positioned on the leading edge of an airfoil.

In some embodiments there can be more than one cascaded slat/nacelle/EDF assemblies 100 in series (e.g. vertically). The exemplary embodiment in FIG. 9 shows two such cascading slat/nacelle/EDF assemblies 100.

Figure 10:
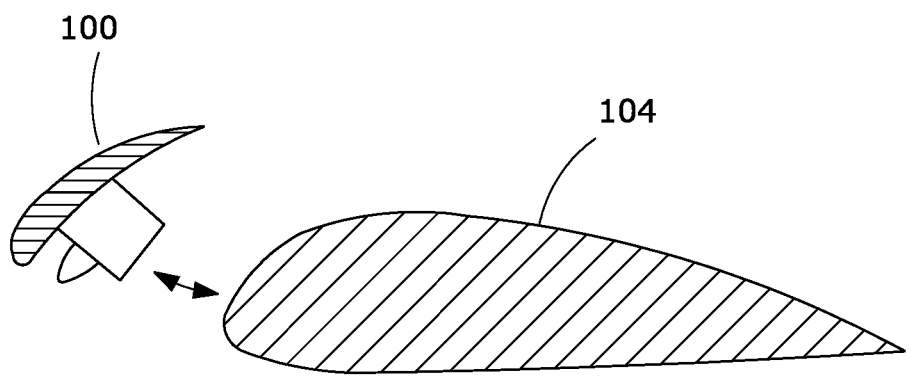
FIG. 10 illustrates a detachable, and securely attachable slat/nacelle/EDF assembly, allowing storage of the slat/nacelle/EDF assembly when not in use.

In some embodiments the entire slat/nacelle/EDF assembly 100 can be removed from and reattached to the ALE 104 as shown in FIG. 10. In this embodiment, assembly 100 and/or ALE lifting surface 104 comprise mechanisms well known to one of skill in the art to securely fix the assembly 100 for flight, and release it for storage. The removed elements can be stowed in the fuselage of the aircraft or other location. In some embodiments the removal or installation can be made without tools, in-the-field. In some embodiments, leading-edge lifting surface assembly 100 may be segmented and nested together to minimize space needed for storage.

Figure 11:
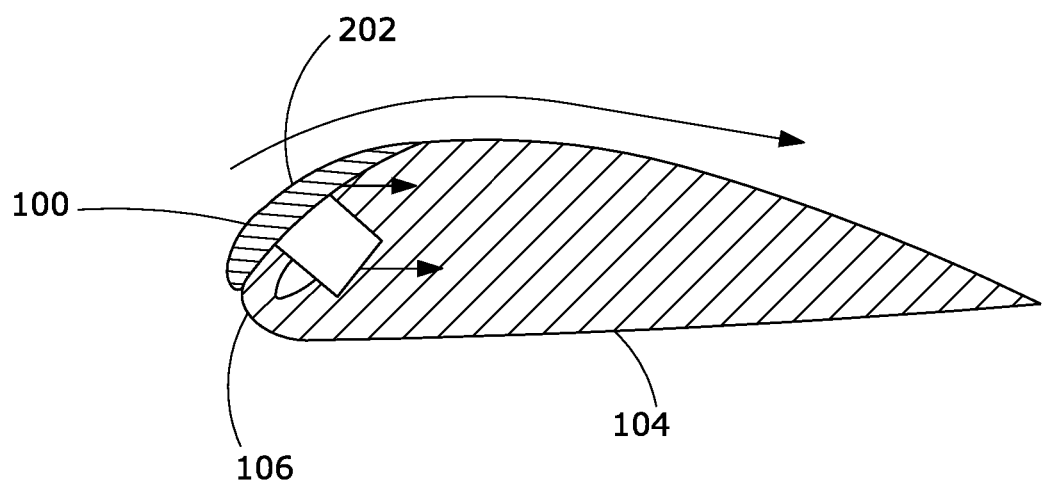
FIG. 11. illustrates a retractable slat/nacelle/EDF assembly that is stored within the airfoil interior, such as during cruise flight legs.

In some embodiments the slat/nacelle/EDF assembly 100 can be retracted as shown in FIG. 11 into the ALE lifting surface 104 for some flight conditions and then extended for others. In the illustrated embodiment, the slat/nacelle/EDF assembly 100 is retracted toward leading edge 106 of airfoil or ALE 104 (indicated by the arrows). The slat/nacelle/EDF assembly 100 may be fully retracted, as shown, covering native leading edge 106 of airfoil or ALE 104. In some embodiments, it is partially retracted to a suitable distance from native leading edge 106 of airfoil 104. The slat/nacelle/EDF assembly 100 may be retracted to reduce its aerodynamic effect. As an example, the slat/nacelle/EDF assembly 100 may be retracted to reduce drag during cruise conditions when the slat/nacelle/EDF assembly function is not warranted. The top surface 202 of the slat/nacelle/EDF assembly 100 may have a curvature that is substantially different from native leading edge 106 of airfoil 104 and may provide alternate aerodynamic characteristics to airfoil 104 when fully or partially retracted. Power for the retraction or extension can come from an external source, aerodynamic forces or a combination of the two.

Figure 12:
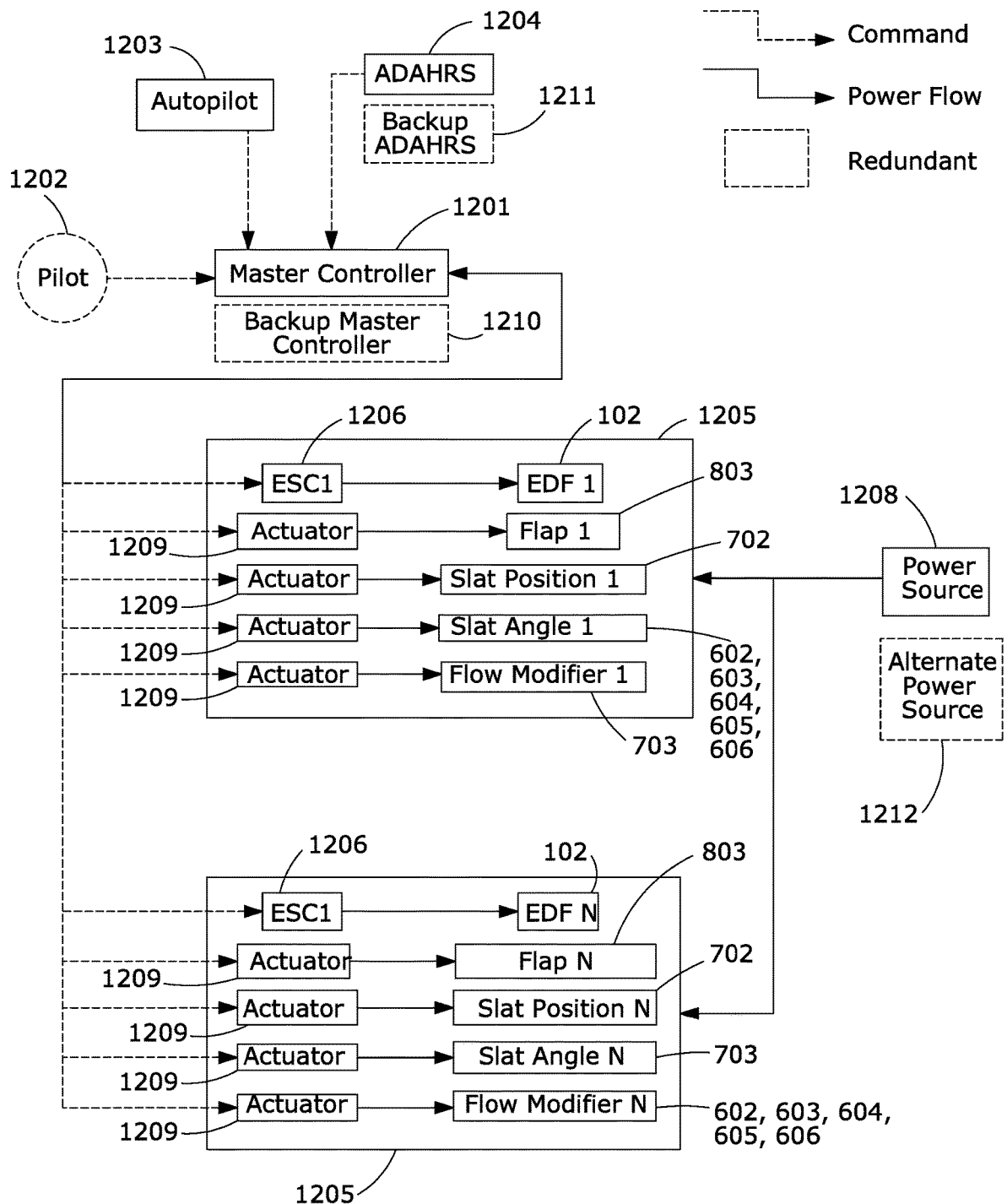
FIG. 12 is an exemplary block diagram of an embodiment of the operational control system linked to the aircraft and the slat/nacelle/EDF assemblies.

In FIG. 12, an embodiment of an electrical circuit that is the operational control system represented as a block diagram. Control is managed by master control unit 1201. In one embodiment, the control system comprises a single master control unit 1201 as shown in FIG. 12. In other embodiments, the control system comprises two or more redundant backup master controller units 1210, each backup master controller unit 1210 comprising a duplicate master controller unit, as indicated by the dashed box 1210 in FIG. 12.

Referring again to FIG. 12, master control unit 1201 comprises one or more inputs and one or more outputs. In some embodiments, one or more inputs to master controller unit 1201 communicate with human-machine interface 1202, which, by way of example, may be a control panel manually operated by a human pilot of the aircraft. A number of digital and analog signals may be generated by the human-machine interface. In some embodiments, one or more inputs to master controller unit 1201 communicate with autopilot system 1203. In some embodiments, autopilot system 1203 may comprise a conventional autopilot found onboard many aircraft and known to persons skilled in the art. Conventional autopilot systems comprise functions that command the aircraft to hold the altitude and heading, or similar flight desires. In other embodiments, autopilot system 1203 comprises more functions than found in a conventional autopilot system. These extra functions provide enhanced capabilities over and above conventional autopilots for controlling flight parameters that affect aerodynamic characteristics, ride quality, vortex dissipation and other features described below. In some embodiments the system will enhance the lift and drag characteristics during takeoff, climb out, descent and landing.

In some embodiments, one or more inputs to master controller 1201 communicate with at least one Air Data/Attitude/Heading Reference System (ADAHRS) unit 1204. As known in the art, an ADAHRS unit, such as that indicated by 1204, comprises a plurality of micromachined electro-mechanical systems (MEMS) sensors, including accelerometers, gyroscopes and magnetometers on all three axes that measure aircraft and system data such as yaw, pitch and roll, as well as speed, attitude, and acceleration rates. ADAHRS unit 1204 may comprise a microprocessor that communicates with the plurality of MEMS sensors, collects and processes signals from the individual sensors, may store the digitized data, then send the data to master controller unit 1201. In some embodiments the ADAHRS system will also sense and communicate the altitude and distance from a preferred landing or take off spot. FIG. 12 shows one embodiment having a single ADAHRS unit 1204. Other embodiments may comprise redundant backup ADAHRS units 1211, each redundant backup unit 1211 comprising a single ADAHRS unit. This is indicated in FIG. 12 by the dashed box.

In typical embodiments, master controller unit 1201 manages a plurality of slat/nacelle/EDF installations 1205. Referring again to FIG. 12, master controller unit 1201 comprises one or more outputs that communicate with one or more slat/nacelle/EDF installation interfaces 1205. Each slat/nacelle/EDF interface 1201 comprises an electronic speed controller (ESC) 1206 and a plurality of actuators 1209. Firstly, master controller unit 1201 commands at least one electronic speed controller (ESC) 1206, controlling the speed of each EDF fan 102. In some embodiments, ESC 1206 modulates energy supplied by power source 1208 as commanded by master controller 1201. Power source 1208 may comprise batteries, a fuel cell, an engine/generator or other electrical energy source. Further, power source 1208 may have one or more backups 1212 as shown indicated by dashed box in the block diagram of FIG. 12. In some embodiments, each backup 1212 may simply be a reconfiguration of the power sources in 1208 to supply the required power to the EDFs.

In some embodiments, each ESC 1206 comprises sensors that measure the state of the EDF 102 under its control, such as its rotational speed (e.g., rpm), power utilized or air flow rate, and sends the information back to master controller unit 1201. In this way, master controller unit 1201 also receives information on the state of each EDF 102 from each ESC 1206. The sensor information is combined with that from ADAHRs 1204 to respond to commands from human pilot 1202 or autopilot 1203.

In some embodiments, master controller unit 1201 may also command one or more actuators controllers 1209 that communicate with actuators that control the geometry of each EDF nacelle 103, slat position 702 or angle 703, flow modifiers 602, 603, 604, 605, or 606, or trailing edge surface 803 to modify the airflow from the EDF over the upper aerodynamic surface. The combination of the slat/nacelle/EDF, flow modifiers, and trailing edge surfaces allow the lift and thrust distribution on the lifting surface to be tailored to suit the flight requirements.

In some embodiments the system is able to sense and reactively control the EDFs, TE surfaces, slat position and angle, or flow modifiers to affect one area of the lifting surface, for example that affecting a flap, or one wing, with linear or non-linear manual, open loop or closed loop control.

Additionally, the EDFs 102 are powered by batteries or other electricity storage methods contained on the airplane. This EDF power system may be stand alone or be integral with the aircraft's electrical system. EDFs may also be powered by a generator/alternator driven by the aircraft main propulsion engine or by a stand-alone engine. Power generated may directly power the EDFs or may charge batteries which then power the EDFs. On board power generation systems may be single entities or duplicate for redundancy.

The power to the EDFs is controlled either communally, individually or in some combination of the two. The amount of power is controlled by the pilot, automatically or some combination as is described, for example, in U.S. Pat. No. 10,099,793 B2.

Control of EDF power output may be analog or digital, open or closed loop, and may include sensors for detecting angle-of-attack, airspeed, and local airflow pressures and velocities.

In some embodiments the system can be minimalized with only the pilot 1202 providing simple off/on input to the master controller 1201 which simple controls the ESCs 1206 to provide the same power to all EDFs 102. With this system the pilot either wants all the EDFs off or on. The other items in FIG. 12 are not included in this minimal system.

Figure 13:
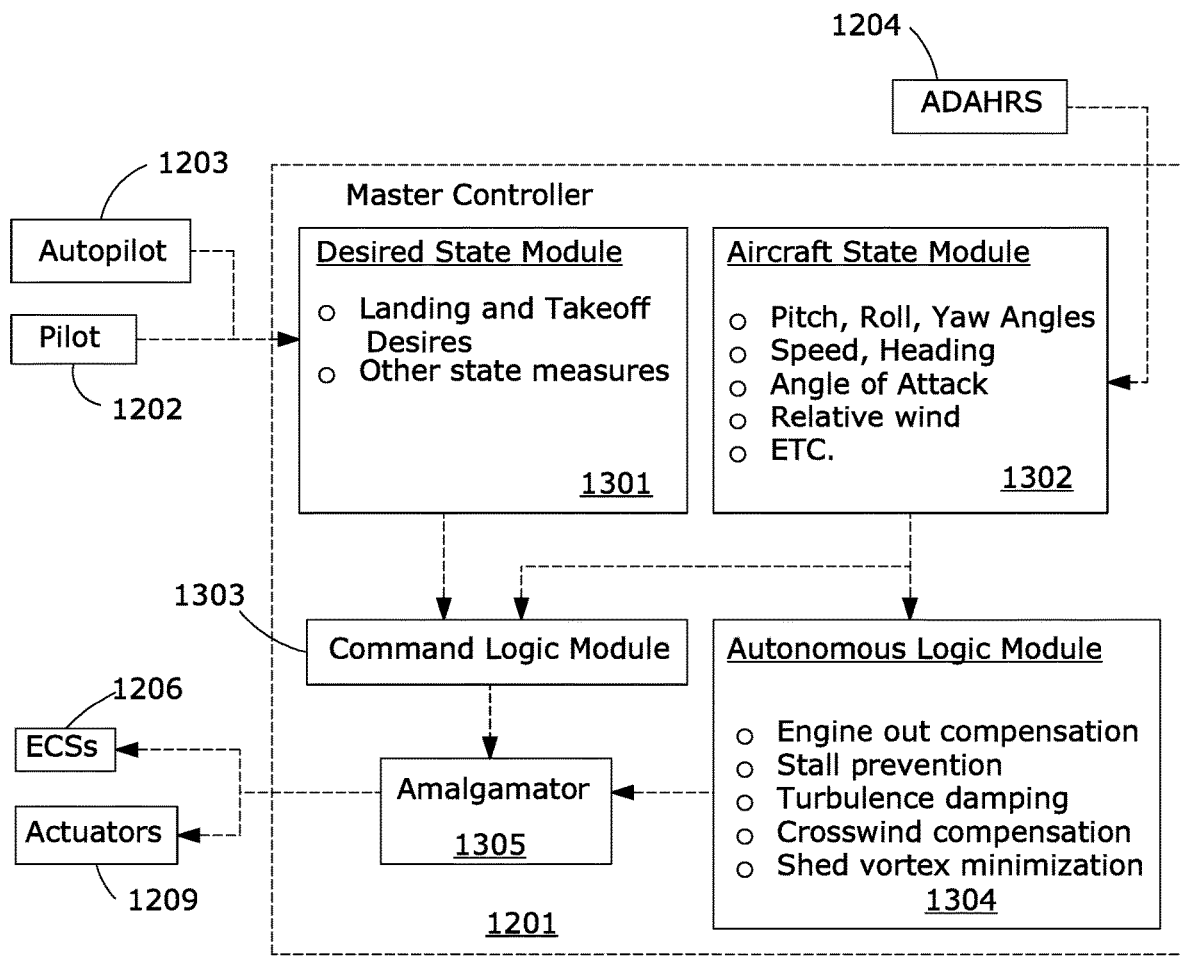
FIG. 13. is an exemplary block diagram of an embodiment of the master control unit linked to the aircraft, the slat/nacelle/EDF assemblies.

Referring to FIG. 13, the master control unit 1201 is detailed. In some embodiments, master control unit 1201 has five major subsystems. Inputs from the pilot 1202 and autopilot 1203 are combined in the Desired State Module 1301 to define the preferred aircraft situation in terms of landing and take-off desires and other desired state measures. In some cases, this desired state is input solely from the pilot (e.g., manually) and the autopilot is turned off. In other cases, the pilot is inactive and is relying solely on the autopilot for control of the aircraft and is not providing input. At times both the pilot and autopilot are providing input and the logic in the Desired State Module 1301 combines them to develop a single desired state.

The Aircraft State Module 1302 accepts input from the ADAHRS 1204, and based on this input, computes information for comparison to the desired state developed in the Desired State Module 1301 where this comparison occurs in the Command Logic Module 1303. It may also compute from the ADAHRS 1204 input information needed by the Autonomous Logic Module 1304.

The Command Logic Module 1303 compares the desired state from the Desired State Module 1301 with the actual state form the aircraft state module 1302 to determine the needed change in the aircraft control to have the two states match. The aircraft control is provided by changes to the power to the ESC 1206 and actuators' 1209 settings.

The actual state of the aircraft is also provided by the Aircraft State Module 1302 to the Autonomous Logic Module 1304. The information provided is used to determine ESC 1206 and actuator 1209 changes needed to maintain desired autonomous states. In this embodiment five autonomous functions are itemized: engine out compensation, stall prevention, turbulence damping, cross-wind compensation and shed vortex minimization. Other autonomous functions may be integrated into the Autonomous Logic Module 1304.

The Command Logic Module 1303 and the Autonomous Logic Module 1304 both supply their control desires to the Amalgamator 1305 that uses its internal logic to control the ECSs 1206 and actuators 1209 to best achieve the desired state and the autonomous functions.

In a minimal system the master controller is a simple pass through system where the pilot input 1202 is passed directly to the ESCs 1206 without reference to any of the other elements of FIG. 13.

Figure 14:
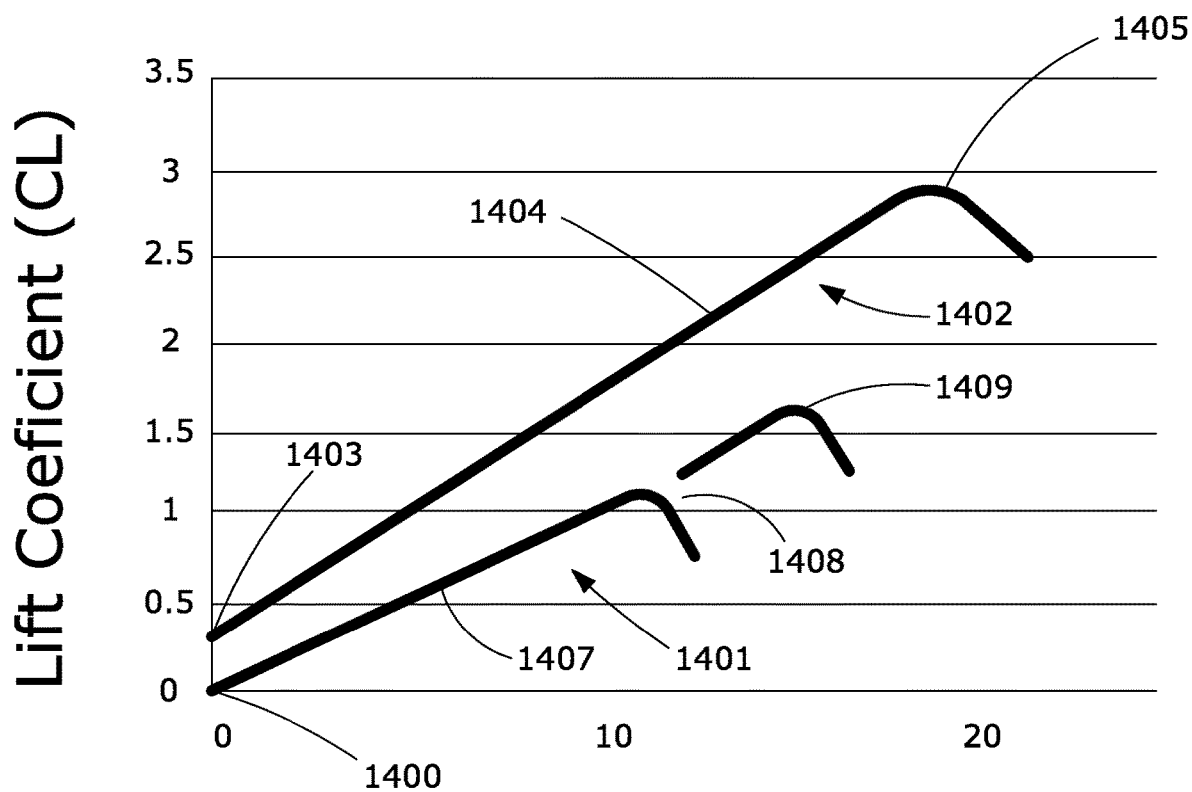
FIG. 14 is a plot of the lift coefficient (y-axis) versus the angle of attack in degrees (x-axis) for the airplane with and without the slat/nacelle/EDF assemblies installed on the airfoils, to demonstrate that the slat/nacelle/EDF assemblies provide increased $C_{L0}$ value, lift curve slope, and maximum lift.

FIG. 14. shows lift curves for a section of a lifting surface—the lift coefficient ($C_L$) on the y-axis versus the angle of attack in degrees on the x-axis. A lifting surface section without slats or distributed electric ducted fans (EDFs) has a lift curve 1401 that is characterized by three variables: $C_{L0}$ 1400, the lift coefficient when the angle of attack is zero; the lift curve slope $C_{L\alpha}$ 1407; and the maximum lift coefficient, $C_{Lmax}$ 1408. A lifting surface section with leading edge slat typically is the same $C_{L0}$ and $C_{L\alpha}$ as without, but with a much higher value of $C_{Lmax}$ 1409. A lifting surface section with the slat/nacelle/EDF system of the present invention exhibits a lift curve 1402 having different values of $C_{L0}$, slope and $C_{Lmax}$ compared to a lifting surface section lacking EDFs (1401). Specifically, the $C_{L0}$ value 1403, lift curve slope 1404 and maximum lift 1405 are all increased relative to like parameters of lift curve 1401. The exact shape of the enhanced curve and the values of $C_{L0}$ 1403, $C_{L\alpha}$ 1404 and $C_{Lmax}$ 1405 is a function of how the exhaust from the EDF is molded by the EDFs 102, the nacelles 103, the slat geometry 101, flow modifiers 602, 603, 604, 605, and 606, the air entrainment in the gap 107, and the trailing edge surfaces as it flows over the upper aerodynamic surface 106 (e.g. see FIGS. 1, 2, 6, 8).

Figure 15:
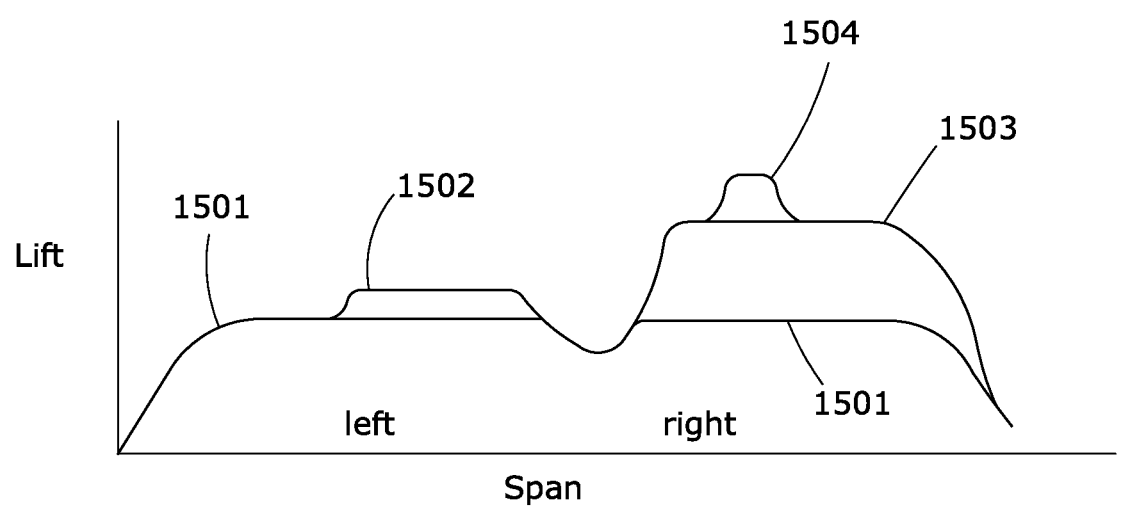
FIG. 15 is a plot of the lift (y-axis) versus the entire airplane wingspan (x-axis) to demonstrate the ability of the present invention to significantly increase the airplane lift as compared to a fixed slat and a plain wing.

In FIG. 15, the spanwise distribution of lift as characterized by lift curve 1501 for each spanwise section greatly affects the performance and control of an aircraft. Generally, this lift characteristic is formed by the shape of the lifting surface and modifications to it with leading edge and trailing edge surfaces. This spanwise lift distribution for a plain wing 1501 at a given angle of attack is shown in FIG. 15 as a dashed line. The dip in the middle is due to the fuselage. This curve is modified 1502 for a lifting surface in this instance with a fixed slat on the inner half of the left wing. For this innovation, the lift is further increased 1503 by slat/nacelle/EDF assembly installation, which in this instance is installed on the entire span of the right wing. Further the slat/nacelle/EDF installation in combination with the flow modifiers (FIG. 6, 602-606) can, in this instance, affect the local lift 1504. This modification can be controlled as previously described to optimize for different flight conditions. This reshaping can be in real time response to pilot or autopilot controls, gusts sensed or the need to manage the shed vortex. For example, if a downdraft is sensed, the lift distribution can be locally increased, as demonstrated by lift curve 1504, to compensate for the effect of the downdraft on the airfoil, resulting in a smoother ride for passengers. This may be accomplished by master controller 1201 altering the power to EDFs 102, or by the configuration of the slat 702, 703, nacelle, flow modifiers 602, 603, 604, 605, 606, or trailing edge surfaces 803 or 804 through commands to actuators 1209.

Method of Use

The synergistic integration of multiple distributed electric ducted fans (EDFs) accelerating the air in the gap formed by a slat mounted on a lifting surface to supply upper surface blowing over a portion of the lifting surface in the manner suggested in the drawing FIG. 4, and optionally combined with a control system to manage the individual EDFs in FIGS. 12 and 13, the slat/nacelle/EDF system and associated flow modifiers, has many advantages for aircraft especially during the takeoff, climb out, descent and landing phases of flight.

This concept can be added to existing aircraft providing a JATO-like (Jet Assisted Take Off) boost on takeoff, built into the wings, or even retractable when not in use, as shown in FIG. 11. Rather than the electric propulsion being used to add thrust solely, this present innovation also provides a dramatic increase in lift by increasing the speed of the air over the top surface of the wing. The distributed small electric propulsors alter the airflow over the wing in ways not possible with one or a few large engines. The integration with slat and optionally flow modifiers, allows the airflow to be tailored for best performance for a given phase of flight or maneuver. The present innovation can provide improved low-speed control on takeoff, climb out, descent and landing, enhanced stall characteristics and margins, reducing loss-of-control (LoC) during these critical periods and provide improved handling qualities during gusts and crosswinds.

The optional control system senses the state of each EDF, slat, flow modifier and trailing edge surface; the aircraft attitude; and the surrounding air conditions. Based on these and signals from a human pilot, an autopilot or internal logic, it manages the electric power provided to each EDF and configuration of the other surfaces. This integration of the master controller unit with the distributed EDFs allows for the novel and improved aerodynamics, reaction to pilot or autonomous commands, virtual elimination of stalls and reduction of the effect of turbulence. The instant innovation will enhance short take-off and landing (STOL) performance.

Upper surface blowing over a portion of the lifting surface using slat/nacelle/EDF systems and flow modifiers has the potential to greatly improve the lift coefficient on a substantial portion of the lifting surface. Where previous upper surface blowing has affected a small portion of the lifting surface area, this concept encompasses a substantial portion of the lifting surface.

The increased lift coefficient of the airfoil throughout the substantial portion of the lifting surface area allows for a smaller lifting surface area reducing the induced drag and thus effectively increasing the lift/drag ratio of the lifting surface using the same energy as is being used for propulsion.

For landing, takeoff, or other situations needing high lift at low speed, flaps can be deployed (see FIG. 8, 803, 804) on a portion of the trailing edge of the lifting surface. Upper surface blowing over a substantial portion of the lifting surface increases the lift dramatically when compared to traditional flap systems, allowing for improved STOL performance. Since the lift coefficient can be greatly increased with the combination of blowing and flaps across a substantial portion of the lifting surface, there is no need for high angles of attack for short take-off and landing.

Upper surface blowing over a portion of the lifting surface using slat/nacelle/EDF systems and flow modifiers offer the benefit of control of pitch, roll and yaw. By varying the electrical power to the individual EDF motors or optionally controlling the slat or flow modifiers, the lift distribution and thrust can be real-time tailored to control the airplane much as an aileron or lifting surface warping. This aspect of the instant innovation may allow banking control without the need for ailerons. Similarly, by controlling the thrust along with the other options, the lift distribution may be symmetrically maintained while the asymmetric trust may cause the airplane to yaw. Finally, if distributed electric ducted fans are integrated into multiple surfaces of the airplane, for example, the lifting surface and horizontal tail or two tandem lifting surfaces; then pitch may be controlled by the allocation of power the EDFs or the modification of the flow emanating from them on each surface.

The system also allows real-time lift redistribution to improve ride qualities through active gust alleviation. Here, accelerations to the airframe and relative wind angles can be sensed by the ADAHRS and the lift distribution changed to accommodate gusts offering improved ride qualities. Studies have shown that altering the lift distribution using actively controlled flaps and ailerons reduced accelerations by 15-50% on a Cessna 1302B. The current innovation can even have a greater effect on the lift distribution than discrete trailing edge devices (i.e. flaps and ailerons) and thus may give even a greater reduction in accelerations and thus better ride qualities. Gust alleviation can also improve aircraft structure life by reducing the loads on the airframe.

A limitation on the spacing of aircraft when landing is the effect of the wake turbulence one airplane has on another aircraft that is trailing it. Wake turbulence is caused by the lifting surface tip vortex shed in creating lift and producing induced drag. Aircraft spacing at airports, and thus the traffic density at them, is determined by a safe wake clearance. It has been shown that the sensitivity of wakes to merge and dissipate is sensitive to small changes in the spanwise load distribution. According to the instant innovation, the control system may affect the lift distribution during approach and landing causing wakes to dissipate more rapidly. This may allow airplanes to land closer together increasing the density of air traffic near airports.

A dreaded situation in single engine aircraft is for the engine to quit and a limitation of twin-engine aircraft is its ability for safe flight on a single engine. This concept allows for a decreased effect of an engine-out situation. If there are a high number of EDFs on each lifting surface, according to the instant innovation, the loss of single or even multiple motors can be compensated through the redistribution of power to the remaining EDFs. This aspect of the instant innovation greatly adds to the safety of an airplane.

By its very nature, the instant innovation helps the flow remain attached to the airfoil and thus makes stalls unlikely. By way of example, if the ADAHRS senses incipient stall at any location on a lifting surface, it can alter the power to the EDF or the configuration of the slat, nacelles or flow modifiers to compensate for the incipient stall by entraining airflow. By managing the lift distribution on a lifting surface in cross winds can be compensated for greatly easing landing and taking off when the wind is not directly aligned with the runway.

A system comprising leading-edge lifting surface slat and associated EDFs may power an aircraft in the event the primary system is shut down or fails. Performance may be limited to less than that possible with the primary propulsor but is sufficient to add safety in a primary propulsor failure situation.

It is to be understood that the system described in this patent could be retrofitted to an existing airplane with minimal modifications and limited function or could be designed and built into a new airframe with higher or complete functionality. As an addition to an existing airframe the slat/nacelle/EDF system 100 could be fastened on each wing and limited wiring supplying current and control run to the cockpit. In the cockpit, in addition to the needed batteries (a power source 1208) a single off/on switch could be supplied for the pilot 1202 to actuate 1206 and deactuate the system. In such a minimal system the master controller 1201 is reduced to being the off/on switch. All the other elements of FIG. 12 could be optional addons for to the system.

It is to be understood that the system described in this patent could be retrofitted or applied to lifting surfaces other than the main lifting wing, such as to canards or horizontal stabilators.

It is to be understood that the foregoing embodiments are exemplary, and that the innovative technology is by no means limited to only the embodiments disclosed herein. Equivalent variations not hitherto disclosed are to be understood as remaining within the scope and the spirit of the instant innovation, as claimed in the claims below.

What is claimed is:
1. A powered aerodynamic lift device, comprising:
 a) one or more slat/nacelle/EDF lift assemblies distributed along a span of an upper aerodynamic surface near a leading edge of an aerodynamic lifting element (ALE), each slat/nacelle/EDF lift assembly comprising:
  i) a slat positioned above the leading edge of the aerodynamic lifting element;
  ii) two or more nacelles positioned beneath and connected to the slat, wherein said nacelles are spaced apart to create at least one gap between the slat and the leading edge of an aerodynamic lifting element;
  ii) an electric duct fan (EDF) housed within each of the one or more nacelles, each EDF comprising a fan and a power source to operate the fan, wherein each EDF forces accelerated air through the fan and the gaps; and b) wherein the one or more slat/nacelle/EDF lift assemblies provide the aerodynamic lifting element increased lift and thrust, improved stall characteristics and margins, enhanced low-speed control and reduced loss-of-control during an aircraft's takeoff and landing, and improved aircraft handling during gusts and crosswinds.

2. The powered aerodynamic lift device of claim 1, further comprising a) at least one aerodynamic lifting element (ALE) on an aircraft, the ALE comprising a span, the leading edge, a trailing edge, and the upper aerodynamic surface, wherein at least one of the slat/nacelle/EDF lift assemblies is installed on the at least one ALE.

3. The powered aerodynamic lift device of claim 1, wherein the slat has a length that is substantially equal to the span of the aerodynamic lifting element.

4. The powered aerodynamic lift device of claim 1, wherein the slat has a length that is less than the span of the aerodynamic lifting element.

5. The powered aerodynamic lift device of claim 1, where the slat of the slat/nacelle/EDF lift assembly comprises a variable cross section or a twist.

6. The powered aerodynamic lift device of claim 1, wherein the one or more nacelles and/or the slat/nacelle/EDF lift assembly are retractable into the aerodynamic lifting element.

7. The powered aerodynamic lift device of claim 1, wherein the slat/nacelle/EDF lift assembly is detachable and securely attachable from the aerodynamic lifting element.

8. The powered aerodynamic lift device of claim 1, comprising cascaded slat/nacelle/EDF lift assemblies.

9. The powered aerodynamic lift device of claim 2, wherein the ALE further comprises a trailing edge flap.

10. The powered aerodynamic lift device of claim 1, further comprising: one or more lift modifiers positioned aftward of the slat/nacelle/EDF lift assembly, or on the slat, or on one or more nacelles.

11. The powered aerodynamic lift device of claim 1, further comprising an electrical circuit control system comprising a master control unit able to control the operation of one or more slat/nacelle/EDF lift assemblies, the master control unit comprising: 1) a plurality of electronic speed controllers (ESCs) able to control the speed of the EDFs, and 2) a plurality of actuators.

12. The powered aerodynamic lift device of claim 11, wherein the master control unit further controls the modulation of energy supplied by a power source to the EDFs, wherein the power source comprises one or more of: batteries, a fuel cell, an engine/generator or other electrical energy source.

13. The powered aerodynamic lift device of claim 12, wherein the EDF power source is controlled by the pilot, manually or automatically or some combination thereof.

14. The powered aerodynamic lift device of claim 12, wherein the EDF power source is able to partially power the aircraft in the event of a primary aircraft engine failure.

15. The powered aerodynamic lift device of claim 12, wherein a control of the EDF power source is an analog or digital, open or closed loop circuit, comprising sensors able to detect: an angle-of-attack, an airspeed, and a local airflow pressures and velocities.

16. The powered aerodynamic lift device of claim 11, wherein the actuators are coupled to at least one flow modifier on the aerodynamic lifting element (ALE).

17. The powered aerodynamic lift device of claim 11, wherein the master control unit further controls the geometric position or angle of the one or more slats such that the lift and thrust profiles along the span of the ALE are altered.

18. The powered aerodynamic lift device of claim 11, wherein the master control unit further comprises one or more Air Data/Attitude/Heading Reference System (ADAHRS) that measure the state of the EDF comprising one or more of: a rotational speed, a power utilized or air flow rate, and sends the information back to the master controller unit.

19. The powered aerodynamic lift device of claim 2, further comprising a bottom surface of the slat formed, or an upper surface of the ALE formed, to guide an EDF exhaust over the ALE to create a nozzle of enhanced accelerated airflow.

* * * * *